(12) United States Patent
Brown

(10) Patent No.: US 11,083,208 B2
(45) Date of Patent: Aug. 10, 2021

(54) E-Z FILL BAG

(71) Applicant: Eva Brown, Jasper, TX (US)

(72) Inventor: Eva Brown, Jasper, TX (US)

( * ) Notice: Subject to any disclaimer, the term of this patent is extended or adjusted under 35 U.S.C. 154(b) by 0 days.

(21) Appl. No.: 16/366,812

(22) Filed: Mar. 27, 2019

(65) Prior Publication Data

US 2019/0373911 A1 Dec. 12, 2019

Related U.S. Application Data

(60) Provisional application No. 62/681,139, filed on Jun. 6, 2018.

(51) Int. Cl.
| | | |
|---|---|---|
| *A23G 3/28* | (2006.01) | |
| *B65D 33/25* | (2006.01) | |
| *B65D 77/06* | (2006.01) | |
| *B65D 83/00* | (2006.01) | |
| *B65B 67/12* | (2006.01) | |

(52) U.S. Cl.
CPC ............ *A23G 3/28* (2013.01); *B65D 33/2591* (2013.01); *B65D 77/064* (2013.01); *B65D 83/0055* (2013.01); *B65B 67/12* (2013.01)

(58) Field of Classification Search
CPC .......... A23G 3/28; A23G 3/343; A23G 3/346; A23G 3/0097; B65D 33/2591; B65D 83/0055; B65D 83/0066; B65D 77/064; B65D 67/12; B65B 67/12
USPC ............ 222/92–107, 164–166, 386.5, 541.2; 141/108–109, 165–166, 313–316, 141/363–364
See application file for complete search history.

(56) References Cited

U.S. PATENT DOCUMENTS

| | | | | | |
|---|---|---|---|---|---|
| 3,157,312 | A | * | 11/1964 | Kitterman | B65D 75/5883 222/1 |
| 4,205,765 | A | * | 6/1980 | May | A21C 15/005 222/107 |
| 4,421,253 | A | * | 12/1983 | Croley | B65D 77/061 206/386 |
| 4,558,801 | A | * | 12/1985 | Vilutis | B65D 25/16 217/12 R |
| 4,844,917 | A | * | 7/1989 | DeLorimiere | A21C 15/005 426/87 |
| 5,005,733 | A | * | 4/1991 | Stoody | A61J 9/001 215/11.3 |

(Continued)

*Primary Examiner* — Paul R Durand
*Assistant Examiner* — Andrew P Bainbridge
(74) *Attorney, Agent, or Firm* — Norton Rose Fulbright US LLP

(57) ABSTRACT

An apparatus for dispensing a dispensable product can include a flexible inner container and an outer container. The inner container can have a cavity configured to receive a dispensable product, a top end defining or configured to define a sealable opening in fluid communication with the cavity, and a closed bottom end that defines one or more corners. The outer container can have a cavity configured to receive the inner container, a top end that is open or is configured to be opened, and a closed bottom. The inner container can be sized such that, when the top end of the outer container is open, the inner container is disposable within the cavity of the outer container such that the corner(s) are disposed within the cavity of the outer container and the top end of the inner container is foldable over the top end of the outer container.

7 Claims, 6 Drawing Sheets

(56) References Cited

U.S. PATENT DOCUMENTS

| | | | | |
|---|---|---|---|---|
| 5,538,050 A * | 7/1996 | Galdon | B65B 67/12 | 141/10 |
| 5,979,650 A * | 11/1999 | Dull | B65D 81/245 | 206/447 |
| 6,179,165 B1 * | 1/2001 | Knight | A21C 15/005 | 222/107 |
| 6,899,239 B1 * | 5/2005 | Gray | A61J 9/001 | 215/11.3 |
| 7,097,092 B1 * | 8/2006 | Marrale | B65D 5/5405 | 229/117.3 |
| 8,322,926 B2 * | 12/2012 | Ejeblad | A23G 3/28 | 383/105 |
| 9,346,612 B2 * | 5/2016 | Plunkett | B65D 75/5877 | |
| 9,598,208 B2 * | 3/2017 | Aki | B65D 75/5816 | |
| 10,058,109 B2 * | 8/2018 | Diekhaus | A23G 3/0014 | |
| 2004/0124210 A1 * | 7/2004 | Bartlein | B65D 75/5872 | 222/92 |
| 2004/0169042 A1 * | 9/2004 | Garcia | A47J 36/16 | 220/573.4 |
| 2006/0040035 A1 * | 2/2006 | Thompson | A21D 6/001 | 426/572 |
| 2009/0285940 A1 * | 11/2009 | Foehse | A23G 3/343 | 426/87 |
| 2012/0003353 A1 * | 1/2012 | Lonergan | A21D 10/005 | 426/19 |
| 2012/0279941 A1 * | 11/2012 | Sprehe | B65D 33/2533 | 215/365 |
| 2013/0040017 A1 * | 2/2013 | White | A23P 20/12 | 426/61 |
| 2016/0120203 A1 * | 5/2016 | Arnold | A23G 3/0025 | 426/107 |
| 2017/0341820 A1 * | 11/2017 | Folkmar | B65D 31/18 | |
| 2019/0373911 A1 * | 12/2019 | Brown | B65D 77/062 | |

\* cited by examiner

E-Z FILL BAG

CROSS-REFERENCE TO RELATED APPLICATIONS

The present application claims priority to U.S. provisional patent application 62/681,139 filed Jun. 6, 2018, the disclosure of which is hereby incorporated by reference in its entirety.

BACKGROUND

A. Field of Invention

The present invention relates generally to systems and methods of dispensing batter, dough, or another dispensable product.

B. Description of Related Art

In the process of preparing or using a prepared product, it is often necessary to transfer batter, dough, or another dispensable product from one place to another. This is typically accomplished using utensils like measuring cups, batter dispensers, spoons, ladles, dough dispensers, spouted bowls, and ice-cream scoops. Transferring the dispensable product in this way, however, may be messy and time-consuming. To illustrate, such utensils may require frequent re-filling with the dispensable product (e.g., measuring cups, batter dispensers, spoons, ladles, and ice-cream scoops), necessitate increased clean-up, (e.g., because some of such utensils may be susceptible to spilling), and/or the like, each of which is time-consuming and requires significant energy from the baker to use and/or clean up. Additionally, many utensils may be susceptible to inconsistent dispensing and thus lead to inconsistent and/or unattractive baked goods.

Further, these utensils may not be readily available with the product. For example, manufacturers do not include dispensing tools with baking precursors such as cupcake mixes, cookie dough mixes, and pie filling.

SUMMARY

Thus, there is a need in the art for apparatuses that can precisely and consistently dispense a product without re-fillings and that can be included with a precursor to a dispensable product. Embodiments of the present apparatuses and methods address this need in the art through the use of an outer container and a flexible inner container that can be used to dispense a dispensable product. The outer container or the inner container can contain a precursor to the dispensable product such that precursor can be provided with a dispensing mechanism (e.g., the inner container). The precursor can be removed and used to form the dispensable product, which can thereafter be transferred to the inner container for dispensing. To facilitate this transfer, a top end of the inner container that defines an opening in fluid communication with the cavity of the container can be cuffed over the top end of the outer container, which can provide rigidity and prevent closure of the opening. The inner container can be sealed and at least one of one or more corners defined by a closed bottom end of the inner container can be opened (e.g., by cutting) to create a tip through which the dispensable product can be dispensed consistently and precisely (e.g., by applying pressure to the inner container). The inner container can be sized such that it can receive substantially all of the dispensable product at once, eliminating the need to refill the inner container. The inner container can be used to control dispensing such that the dispensable product is consistently dispensed, minimizing and/or substantially eliminating uneven and inconsistent baking.

Some of the present apparatuses include a flexible inner container and an outer container. The inner container, in some apparatuses, has a cavity configured to receive a dispensable product. In some apparatuses, the inner container has a top end defining or configured to define a sealable opening in fluid communication with the cavity, and, optionally, a closed bottom end that defines one or more corners. The outer container, in some apparatuses, defines a cavity configured to receive the inner container. In some apparatuses, the outer container has a top end that is open or is configured to be opened, and, optionally, a closed bottom end. In some apparatuses, a precursor to the dispensable product is disposed within one of the cavity of the inner container and the cavity of the outer container. In some apparatuses, the inner container is sized such that, when the top end of the outer container is open, the inner container is disposable within the cavity of the outer container such that the one or more corners are disposed within the cavity of the outer container and/or the top end of the inner container is cuffable over the top end of the outer container.

The cavity of the inner container, in some apparatuses, is configured to hold substantially all of the dispensable product. In some apparatuses, the volume of the cavity defined by the inner container is at least 5% larger than the volume of the precursor. In some apparatuses, the top end of the inner container comprises a zip seal or a press seal configured to seal the opening. In some apparatuses, the inner container is disposed within the outer container and, optionally, the precursor is disposed within the cavity of the inner container. In some apparatuses, the inner container is disposed within the outer container and the precursor is disposed within the cavity of the inner container. In some apparatuses, less than or equal to 10% of the precursor, by weight, is liquid. In some apparatuses, the dispensable product is cupcake batter, cake batter, cookie dough, pastry filling, and/or icing. In some apparatuses, the closed bottom end of the inner container defines a single corner. In some apparatuses, the outer container is more rigid than the inner container.

Some of the present methods of dispensing a dispensable product comprise cuffing a top end of a flexible inner container over a top end of an outer container. In some methods, the inner container has a cavity, an opening defined by the top end, and/or a closed bottom end that defines one or more corners, optionally a single corner. The inner container, in some methods, is received in a cavity defined by the outer container such that the one or more corners of the inner container are disposed within the cavity of the outer container. In some methods, the outer container is more rigid than the inner container.

Some methods comprise removing a precursor to the dispensable product from the cavity of the outer container and forming the dispensable product from at least the precursor such that the dispensable product comprises the precursor. Less than or equal to 10% of the precursor, by weight, is liquid in some methods.

Some methods comprise transferring the dispensable product to the cavity of the inner container via the opening. Transferring the dispensable product, in some methods, is performed such that at least 95% of the dispensable product, by weight, is transferred to the cavity of the inner container before removing the inner container from the outer container and/or such that at least 90%, optionally at least 95%, of the precursor, by weight, is transferred to the cavity of the inner container before removing the inner container from the outer container.

Some methods comprise removing the inner container from the outer container and, optionally, sealing the opening of the inner container. Sealing the opening, in some methods, comprises zipping a zip seal of the inner container, closing a press seal of the inner container, and/or twisting the top end of the inner container.

Some methods comprise opening at least one of the one or more corners of the inner container and dispensing the dispensable product through the opened corner(s). Opening at least one of the corner(s), in some methods, comprises cutting, tearing, and/or slicing the at least one corner. In some methods, the dispensable product is cupcake batter, cake batter, cookie dough, pastry filling, or icing.

The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" or can be substituted with "within [a percentage] of" what is specified, where the percentage includes 0.1, 1, 5, and 10 percent.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those one or more elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/have/include/contain—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments are described above, and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Each of the figures is drawn to scale, meaning the sizes of the elements depicted in the figure are accurate relative to each other for at least the embodiment depicted in the figure.

DETAILED DESCRIPTION

Figure 1:
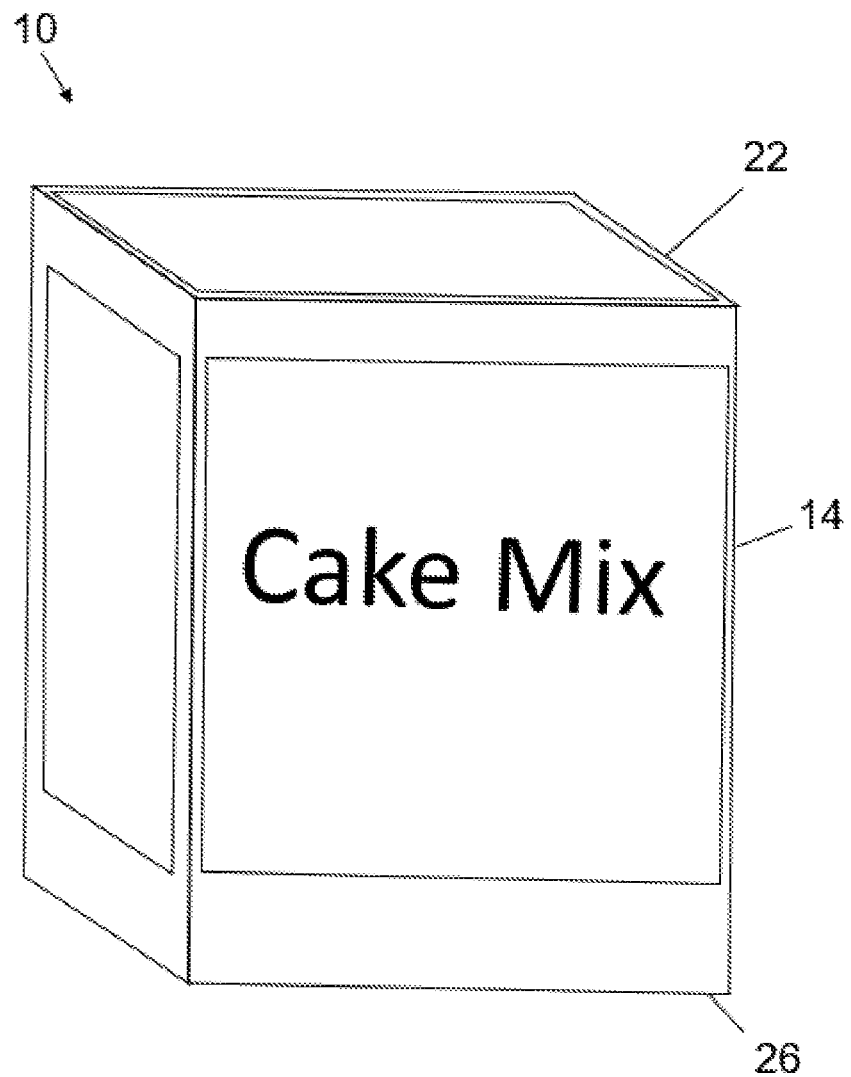
FIG. 1 shows a first embodiment of the present apparatuses that includes an outer container that can house a flexible inner container capable of dispensing a dispensable product. As shown, the outer container is closed.
Figure 2:
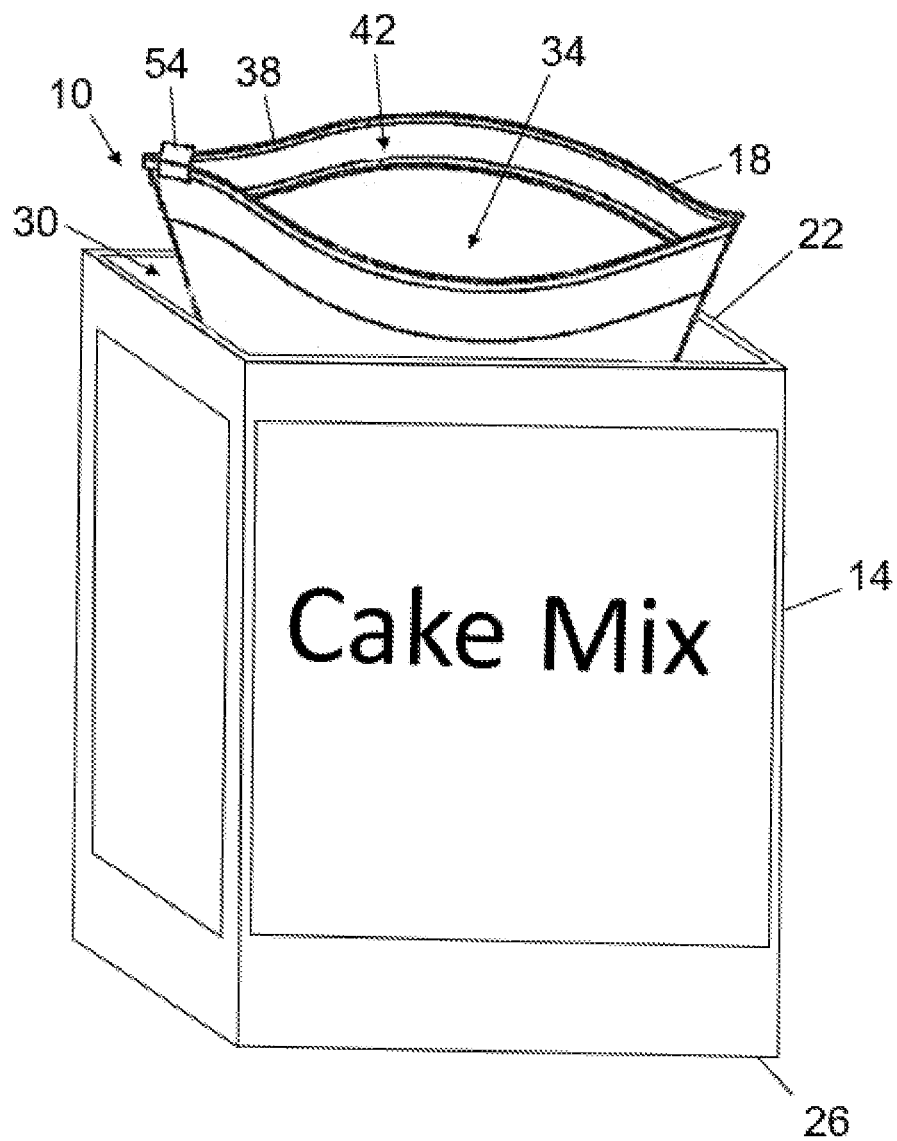
FIG. 2 shows the apparatus of FIG. 1 when the outer container is opened and part of the inner container is disposed within a cavity of the outer container.

Referring to FIGS. 1 and 2, shown is an embodiment 10 of the present apparatuses for dispensing a dispensable product. Apparatus 10 can comprise an outer container 14 and a flexible inner container 18 (e.g., a bag). Outer container 14 can have a top end 22 that is open or configured to be open, a closed bottom end 26, and a cavity 30 configured to receive inner container 18. For example, inner container 18 can be disposed in cavity 30 and top end 22 can be closed (FIG. 1) and thereafter opened (FIG. 2) such that the inner container can be removed from and/or disposed in the cavity; in other embodiments, however, the inner container can be disposed outside of the outer container (e.g., attached to the exterior thereof) and transferred to the cavity to receive a dispensable product (described in further detail below).

Figure 3:
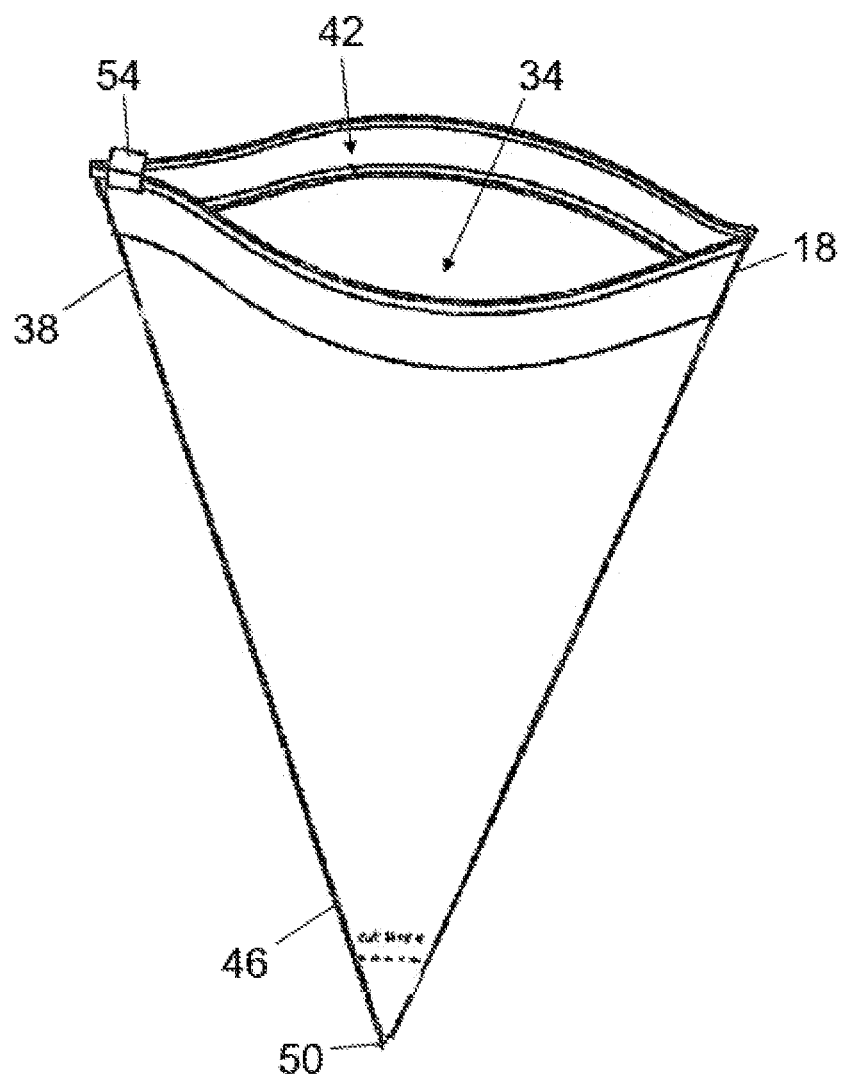
FIG. 3 shows the inner container of the apparatus of FIG. 1. As shown, the inner container has a closed bottom end that defines a single corner and a top end that defines an opening that is sealable with a zip tab.

Referring additionally to FIG. 3, inner container 18 can be configured to hold a dispensable product and/or a precursor to the dispensable product. For example, inner container 18 can have a cavity 34, a top end 38 that defines or is configured to define a sealable opening 42 in fluid communication with the cavity (e.g., such that a dispensable product can be transferred into the cavity via the opening), and a closed bottom end 46 that defines one or more corners 50. To illustrate, inner container 18 can have a sealing mechanism 54 that can be engaged and disengaged to open (e.g., unseal) and close (e.g., seal) opening 42, respectively. Sealing mechanism 54 can comprise any suitable mechanism, such as, for example, a zip tab, a press seal, and/or the like. Additionally or alternatively, inner container 18 can be configured to twist such that opening 42 is sealed. The thickness of inner container 18 can be chosen by the manufacturer based on the designated dispensable product (e.g., a thicker material for cookie dough than for cake batter).

Apparatus 10 can comprise a precursor to a dispensable product. As shown, the precursor can be used to make cake batter; in other embodiments, however, the precursor can be used to make any other suitable dispensable product, such as, for example, a cupcake batter, cookie dough, pastry filling, and/or icing, and can be a dry mix, e.g., such that less than or equal to 10%, by weight, of the precursor is liquid. The precursor can be disposed within one of cavity 30 of outer container 14 (e.g., such that the precursor is contained in the cavity of the outer container, optionally in a separate container within the cavity, but not in cavity 34 of inner container 18) and the cavity of the inner container. In use, the precursor can be removed and used to form the dispensable product (e.g., by adding other ingredients to the precursor and mixing the precursor and ingredients); in other embodiments, however, apparatus 10 can comprise the dispensable product, which can be disposed in cavity 30 or cavity 34. In some embodiments, outer container 14 can contain at least two precursors, at least two dispensable products, or at least one precursor and at least one dispensable product (e.g., cupcake mix and icing).

Figure 4:
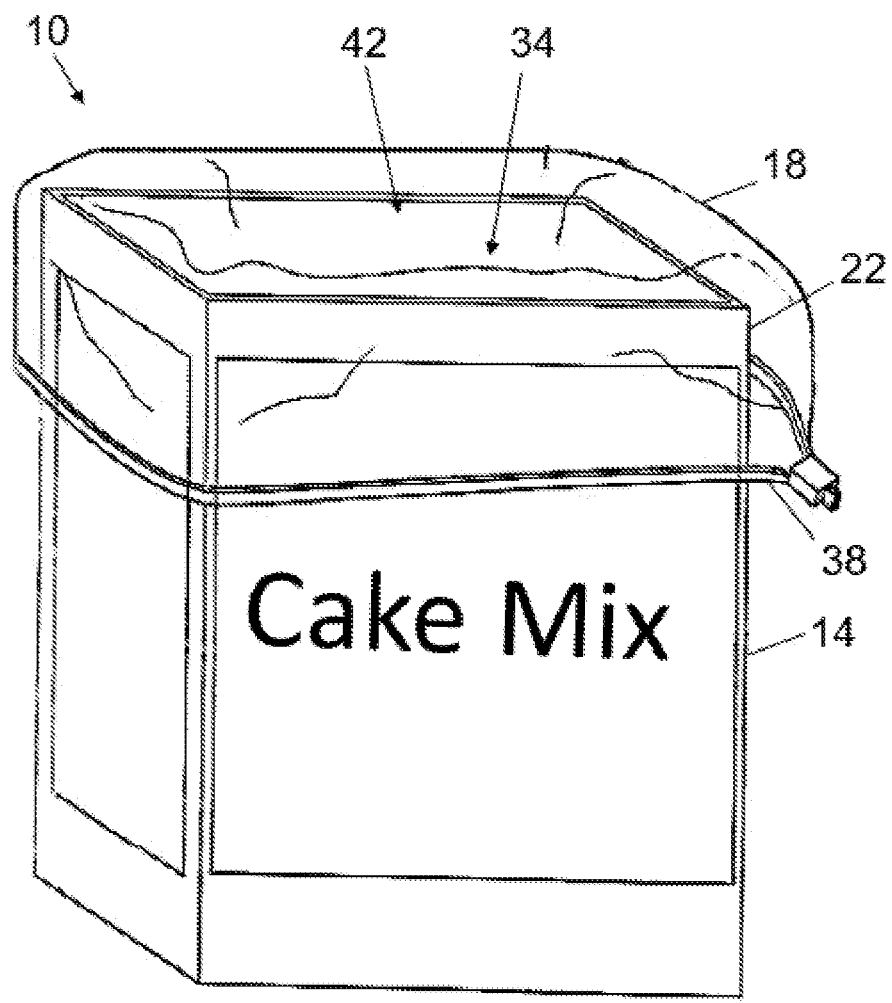
FIG. 4 shows the apparatus of FIG. 1 when the top end of the inner container is cuffed over the top end of the outer container.

Referring to FIG. 4, apparatus 10 can be configured to facilitate transfer of the dispensable product to cavity 34 of inner container 18 such that the inner container can be used to dispense the product. Inner container 18 can be sized such that, when top end 22 of outer container 14 is open, the inner container is disposable within cavity 30 of the outer container such that corner(s) 50 are disposed in cavity 30 and top end 38 of the inner container is cuffable over the top end of the outer container by folding the top end of the inner container over the top end of the outer container (e.g., like a cuffed sleeve). Outer container 14 can be more rigid than inner container 18 (e.g., the outer container can be a cardboard box and the inner container can be a plastic bag) such that the outer container can support the inner container as the dispensable product is deposited into cavity 34 and can prevent opening 42 from closing. Such support can mitigate spillage.

Inner container 18 can have a capacity to hold substantially all of the dispensable product to reduce the need for re-fillings. For example, the volume of the cavity 34 defined by inner container 18 can be at least 5%, 10%, 15%, 20%, 25%, 30%, 35%, 40%, 45%, 50%, 55%, 60%, or more larger than the volume of the precursor (e.g., such that the inner container can accommodate other ingredients added to the precursor to form the dispensable material).

Figure 5:
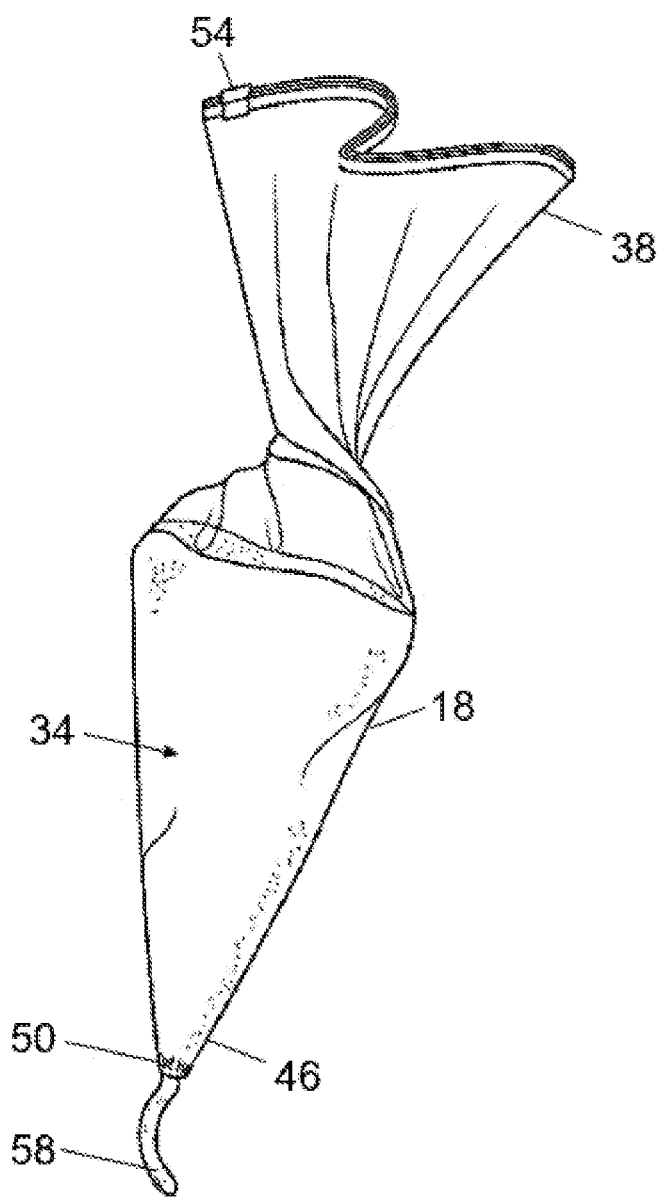
FIG. 5 shows the inner container of the apparatus of FIG. 1 when the inner container is sealed. As shown, the inner container is dispensing a dispensable product.
Figure 6:
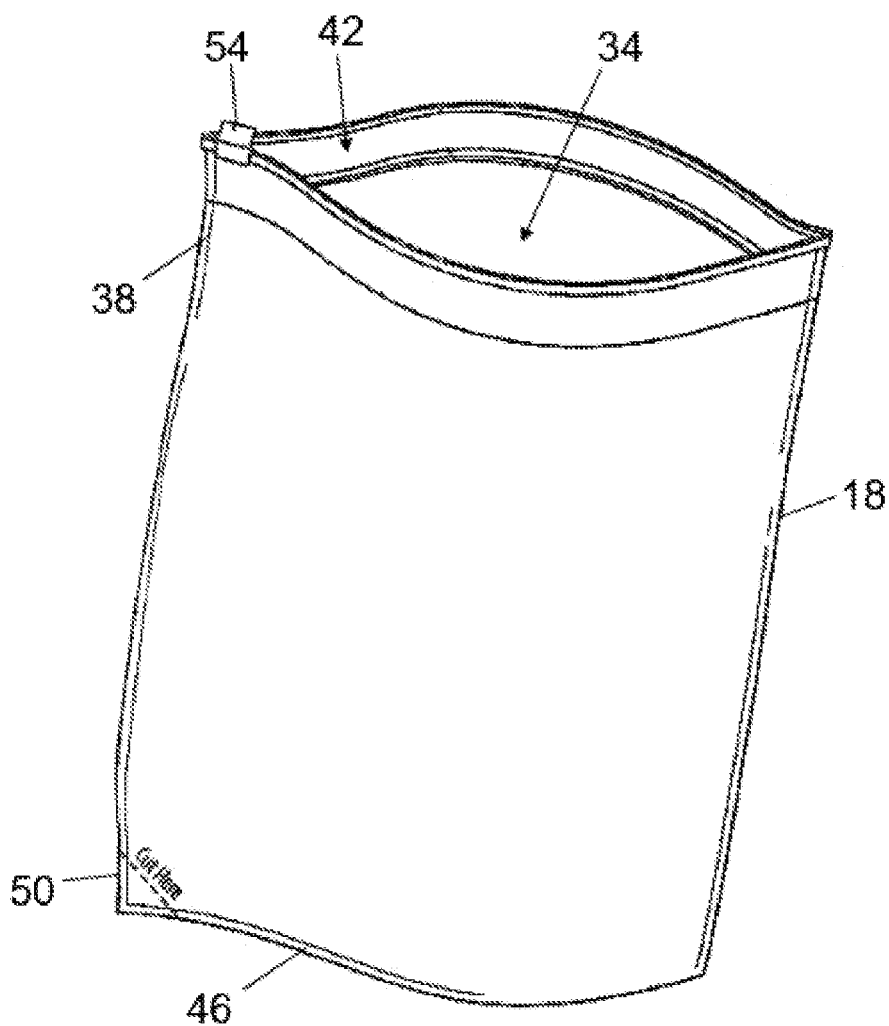
FIG. 6 shows another flexible inner container that can be used in some of the present apparatuses, the bottom end of the inner container defining two corners.

Referring additionally to FIG. 5, inner container 18 can be configured to dispense a dispensable product (e.g., 58) disposed in cavity 34 via at least one of corner(s) 50. At least one of corner(s) 50 can be opened (by cutting, tearing, and/or slicing the corner) such that each of the opened corner(s) defines a tip through which the dispensable product can be dispensed in a precise and consistent manner. For example, bottom end 46 can define a single corner 50, which can promote accurate dispensing; however, in other embodiments, the bottom end of the inner container can define multiple corners (FIG. 6). The flexibility of inner container 18 can facilitate dispensing, e.g., pressure can be applied by squeezing the inner container to urge the dispensable product out of opened corner(s) 50. And, the sealability of opening 42 (e.g., via twisting the inner container and/or engaging sealing mechanism 54, as shown) can mitigate spillage as the dispensable product is dispensed.

Some of the present methods of dispensing a dispensable product (e.g., 58) comprise a step of cuffing a top end (e.g., 38) of a flexible inner container (e.g., 18) over a top end (e.g., 22) of an outer container (e.g., 14). The upper and inner containers can be any of those described above (e.g., the inner container can have a cavity (e.g., 34), an opening (e.g., 42) defined by the top end, and a closed bottom end (e.g., 46) that defines one or more corners (e.g., 50)), and the top end of the inner container can be cuffed while the inner container is received in a cavity (e.g., 30) defined by the outer container such that the corner(s) are disposed within the cavity of the outer container.

Some methods comprise forming the dispensable product from at least a precursor such that the dispensable product comprises the precursor. The precursor can be disposed in the cavity of the outer container or the cavity of the inner container (e.g., before the top end of the inner container is cuffed over the top end of the outer container), and can be removed therefrom to form the dispensable product. The precursor can be any of the precursors described above. (e.g., such that the dispensable product is cupcake batter, cake batter, cookie dough, pastry filling, and/or icing). In other embodiments, however, the dispensable product need not be formed (e.g., can already be formed). Other dispensable products can include drywall mud and the like.

Some methods comprise a step of transferring the dispensable product to the cavity of the inner container via the opening and removing the inner container from the outer container. The dispensable product can be transferred to the inner container in any suitable manner—such as, for example, by pouring and/or scooping—using any suitable utensil, such as, for example, a scoop, spoon, spatula, spreader, and/or scraper. Transferring the dispensable product can be performed such that, by weight, greater than or equal to any one of, or between any two of, 80%, 85%, 90%, 95%, or more (e.g., at least 95%) of the dispensable product, and/or greater than or equal to any one of, or between any two of, 80%, 85%, 90%, 95%, or more (e.g., at least 90% or 95%) of the precursor is transferred to the cavity of the inner container before removing the inner container from the outer container.

Some methods comprise sealing the opening of the inner container (e.g., by zipping a zip seal of the inner container, closing a press seal of the inner container, and/or twisting the top end of the inner container) and opening at least one of the one or more corners of the inner container. Opening at least one of the corner(s) can comprise cutting, tearing, and/or slicing the at least one corner.

Some methods comprise a step of dispensing the dispensable product through the opened corner(s). The dispensable product can be dispensed at least by exerting pressure on the inner container.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

EXAMPLES

The following examples are included to demonstrate preferred embodiments. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

A box contained (1) an inner container, which was a large, flexible bag, (2) cupcake mix in a separate bag, and (3) instructions regarding how to bake the cupcakes and use the inner container to dispense batter from the inner container. The inner container had press tabs to seal the bag at the top end thereof and one corner at the bottom end thereof to that was used as a dispensing tip.

The box was opened, the dry cupcake mix was taken out of the bag and combined with one cup of water, half a cup of vegetable oil, and three eggs to in a bowl to create cupcake batter. The top end of the inner container was cuffed over the top end of the box while the inner container was received in the cavity of the box such that the box held the inner container open, and the cupcake batter was transferred to the inner container by pouring the cupcake batter therein. The transfer of the cupcake batter took 15 seconds. The inner container was sealed by pressing the press seal, and the tip was created by cutting the corner at the bottom of the inner container. The top end of the inner container was twisted to exert pressure on the cupcake batter, which was dispensed through the opened corner and into 24 cupcake tins. The dispensing of the cupcake batter into the cupcake tins took 50 seconds.

The inner container did not have to be refilled to fill the 24 cupcake tins. Additionally, the cupcake batter was dispensed evenly to yield consistent cupcake sizes and baking times. Spillage was minimal—excess batter did not spill over or drip to the sides of the tins or the counters.

The invention claimed is:

1. A method of dispensing a dispensable product, the method comprising:
cuffing a top end of a flexible inner container over a top end of an outer container, wherein:
the inner container has a cavity, an opening defined by the top end, and a closed bottom end that defines a single corner; and
the inner container is received in a cavity defined by the outer container such that the single corner of the inner container is disposed within the cavity of the outer container;
the cavity of the inner container is configured to hold substantially all of the dispensable product to be dispensed;
removing a precursor to the dispensable product from the cavity of the outer container;
forming the dispensable product from at least the precursor such that the dispensable product comprises the precursor;
transferring the dispensable product to the cavity of the inner container via the opening or forming the dispensable product in the cavity of the inner container, such that at least 95% by weight of the dispensable product to be dispensed is transferred to the cavity of the inner container before removing the inner container from the outer container, and at least 95% by weight of the precursor from the cavity of the outer container is transferred to the inner container before removing the inner container from the outer container;
removing the inner container from the outer container;
sealing the opening of the inner container, wherein sealing the opening of the inner container comprises one or more of: zipping a zip seal of the inner container, closing a press seal of the inner container, closing a press seal of the inner container, or twisting the top end of the inner container;
opening the single corner of the inner container by at one or more of: cutting, tearing, or slicing the single corner to provide an opened corner; and
dispensing the dispensable product through the opened corner;
wherein:
the dispensable product is a baking mix selected from the group of one or more of:
cupcake batter, cake batter, cookie dough, pastry filling, or icing;
less than or equal to 10% by weight of the precursor is liquid; and
the outer container is more rigid than the inner container.

2. The method of claim 1, wherein the outer container comprises a top end.

3. The method of claim 1, wherein the outer container is configured to include the precursor and at least a portion of the inner container, disposed within the cavity of the outer container.

4. The method of claim 1, wherein the step transferring the dispensable product to the cavity of the inner container via the opening or forming the dispensable product in the cavity of the inner container takes no more than 15 seconds.

5. The method of claim 1, wherein the dispensable product is cupcake batter.

6. The method of claim 5, wherein dispensing the dispensable product through the opened corner comprises dispensing the cupcake batter through the opened corner to a cupcake tin; and wherein the step for dispensing the cupcake batter through the opened corner to a cupcake tin takes no more than 50 seconds.

7. The method of claim 1, wherein forming the dispensable product from at least the precursor such that the dispensable product comprises the precursor is performed within the cavity of the inner container.

* * * * *